United States Patent
Takahashi

(10) Patent No.: US 11,529,707 B2
(45) Date of Patent: Dec. 20, 2022

(54) MAIN SPINDLE DEVICE FOR MACHINE TOOL

(71) Applicant: MAKINO MILLING MACHINE CO., LTD., Tokyo (JP)

(72) Inventor: Ikuma Takahashi, Aiko-gun (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 352 days.

(21) Appl. No.: 16/492,301

(22) PCT Filed: Mar. 10, 2017

(86) PCT No.: PCT/JP2017/009818
§ 371 (c)(1),
(2) Date: Sep. 9, 2019

(87) PCT Pub. No.: WO2018/163428
PCT Pub. Date: Sep. 13, 2018

(65) Prior Publication Data
US 2021/0129280 A1    May 6, 2021

(51) Int. Cl.
*B23Q 11/12* (2006.01)

(52) U.S. Cl.
CPC .................. *B23Q 11/127* (2013.01)

(58) Field of Classification Search
CPC ..... B23Q 11/127; B23Q 11/126; B23Q 11/12; B23Q 11/141; B23Q 11/14
See application file for complete search history.

(56) References Cited

U.S. PATENT DOCUMENTS

| | | |
|---|---|---|
| 5,192,139 A | 3/1993 | Hiramoto et al. |
| 6,264,409 B1 | 7/2001 | Date et al. |
| 6,913,390 B2 | 7/2005 | Inoue et al. |
| 2012/0219374 A1 | 8/2012 | Norihisa |
| 2013/0004257 A1 | 1/2013 | Suzuki |

FOREIGN PATENT DOCUMENTS

| | | | |
|---|---|---|---|
| CN | 204381971 U | 6/2015 | |
| JP | H6-206141 | 7/1994 | |
| JP | 8-71888 A | 3/1996 | |
| JP | H9-150346 | 6/1997 | |
| WO | WO-2011092887 A1 * | 8/2011 | ........... B23Q 11/124 |
| WO | 2011/121793 | 10/2011 | |

OTHER PUBLICATIONS

International Search Report dated Apr. 11, 2017, directed to International Application No. PCT/JP2017/009818; 2 pages.

* cited by examiner

*Primary Examiner* — Boyer D Ashley
*Assistant Examiner* — Stephen Sun Cha
(74) *Attorney, Agent, or Firm* — Morrison & Foerster LLP

(57) ABSTRACT

A main spindle device for a machine tool has a hollow main spindle, which is supported by a housing such that the hollow main spindle can rotate. The main spindle device is provided with: an annular cylinder, which is fixed to the housing, and is formed extending into the main spindle, said annular cylinder having an opening formed in the axis line direction of the main spindle; and a cooling path formed on the outer circumferential surface of the cylinder to face the inner circumferential surface of the main spindle.

6 Claims, 3 Drawing Sheets

MAIN SPINDLE DEVICE FOR MACHINE TOOL

CROSS-REFERENCE TO RELATED APPLICATIONS

This application is a U.S. national phase patent application of International Patent Application No. PCT/JP2017/009818, filed Mar. 10, 2017, which is hereby incorporated by reference in the present disclosure in its entirety.

FIELD OF THE INVENTION

The present invention relates to a spindle device for a machine tool which is capable of effectively cooling a spindle having a tool mounted on a tip thereof.

BACKGROUND OF THE INVENTION

Machine tools which machine a workpiece into a desired shape by moving a rotary tool, such as an end mill mounted on the tip of a spindle, and a workpiece, which is affixed on a table, relative to each other have been conventionally known. In such machine tools, the rotary tool is mounted on a tool holder, and the tool holder is drawn and clamped by a draw bar, whereby the tool can be mounted on the tip of the spindle. Patent Literature 1 describes an example of such a spindle device.

Furthermore, since heat is inevitably generated by the bearing or the seal for the lubricant which lubricates the bearing during rotation of the spindle, it is necessary to cool the spindle. Patent Literature 2 describes such a spindle cooling device.

PATENT LITERATURE

[PTL 1] WO 2011/121793
[PTL 2] Japanese Unexamined Patent Publication (Kokai) No. 06-206141

BRIEF SUMMARY OF THE INVENTION

In the spindle cooling device described in Patent Literature 2, a fixed shaft is inserted into the hollow spindle, and the spindle is cooled by flowing coolant within the fixed shaft to cool the fixed shaft. However, in the spindle cooling device disclosed in Patent Literature 2, a spindle provided with a draw bar therein, as described in Patent Literature 1, cannot be cooled.

The object of the present invention is to solve such problems of the prior art, and the present invention aims to provide a spindle device for a machine tool which can effectively carry out cooling even when a tool clamping device such as a draw bar is included therein.

In order to achieve the above object, the present invention provides a spindle device for a machine tool including a hollow spindle which is rotatably supported in a housing, the spindle device comprising an annular boss member which is affixed to the housing, which is formed so as to penetrate into the spindle, and which includes an opening formed in the axial direction of the spindle, and a cooling passage formed in an outer circumferential surface of the boss member so as to face an inner circumferential surface of the spindle.

According to the present invention, cooling of the spindle can be achieved without directly flowing coolant to the spindle. Thus, leakage of coolant from the coolant passage, through which the coolant flows, can be easily prevented. As a result, according to the present invention, a reliable spindle device that not only effectively cools the spindle but which also prevents leakage of coolant can be provided.

DETAILED DESCRIPTION OF THE INVENTION

Preferred embodiments of the present invention will be described below with reference to the attached drawings.

Figure 3:
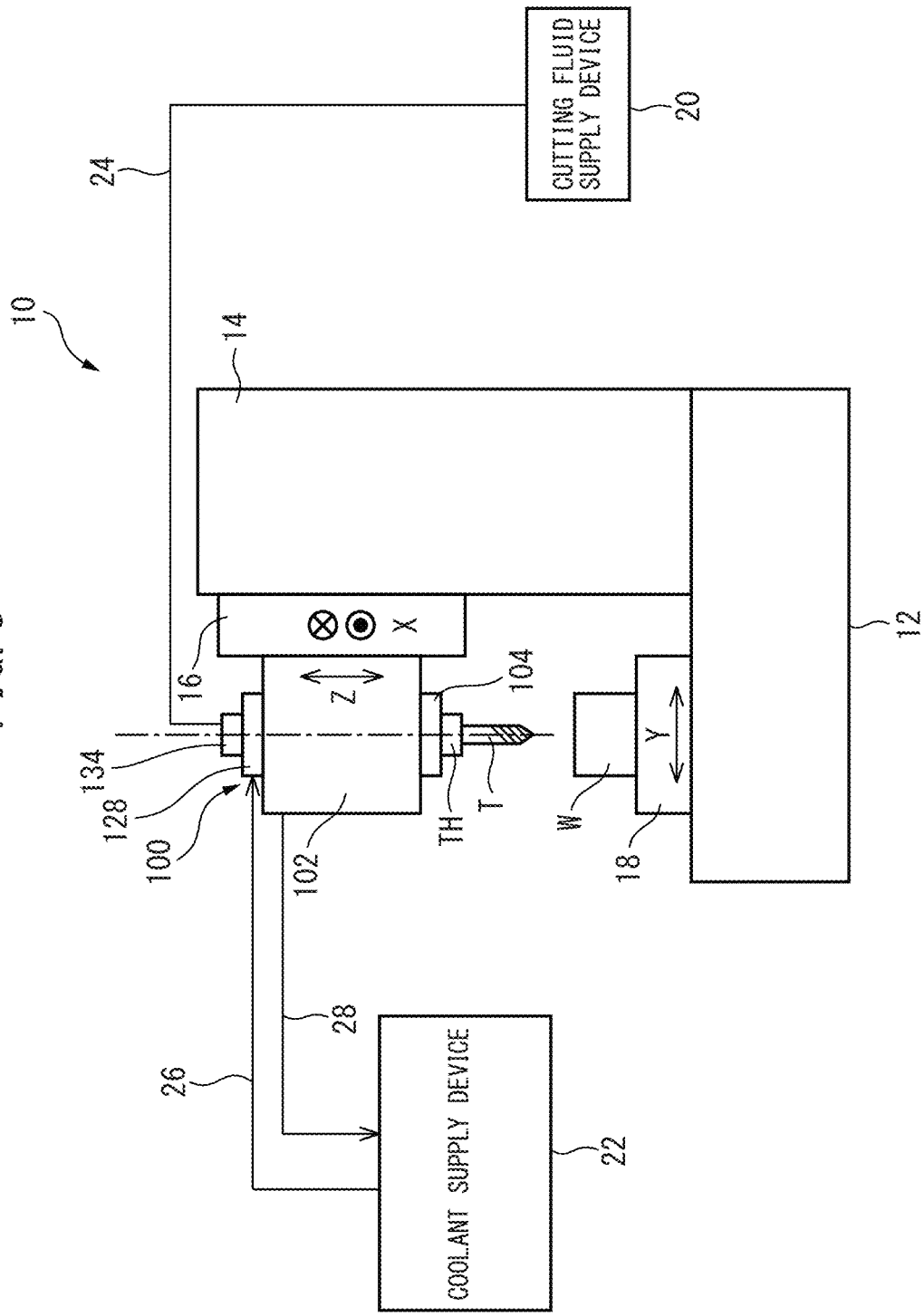
FIG. 3 is a schematic view showing an example of a machine tool comprising the spindle device according to the present invention.

First, FIG. 3 shows an example of a machine tool to which the present invention is applied. In FIG. 3, the machine tool 10 constitutes a vertical machining center, and comprises a bed 12, as a platform affixed to the floor of a factory, a table 18 which is provided on a top surface of a front portion (the left side in FIG. 3) of the bed 12 so as to be movable in the forward and backward directions or the Y-axis directions (the left and right directions in FIG. 3) and on which a workpiece W is affixed, a column 14 which stands on and is affixed to a top surface of the bed 12 on a rear end side thereof (the right side in FIG. 3), an X-axis slider 16 which is provided on a front surface of the column 14 so as to be movable in the left and right directions or the X-axis directions (the directions perpendicular to the sheet of FIG. 3), and a spindle device 100 which is attached to the front surface of the X-axis slider 16 so as to be movable in the upward and downward directions or the Z-axis directions. In the present example, the spindle device 100 supports a spindle 104 which is rotatable about a center axis O which extends vertically parallel to the Z-axis. A rotary tool T is mounted on the tip of the spindle 104 via a tool holder TH so as to face the table 18.

Cutting fluid is supplied to the spindle device 100 from a cutting fluid supply device 20 via a cutting fluid supply conduit 24. In order to supply cutting fluid through the rotating spindle 104 to a machining area between the tool T and the workpiece W, a rotary joint 134 comprising a joint piston 132 is arranged on a rear end of the spindle device 100. The cutting fluid supply conduit 24 can comprise, for example, a cutting fluid tank (not illustrated) for storing cutting fluid, and a cutting fluid supply pump (not illustrated) for discharging the cutting fluid supplied from the cutting fluid tank into the cutting fluid supply conduit 24.

In the spindle device 100, coolant is supplied from the coolant supply device 22 via the coolant supply conduit 26. As described in detail later, the coolant is supplied from a coolant inlet port 140a to the spindle device 100, flows through cooling passages 140, 142, 136b, 144, and 152, and returns to the coolant supply device 22 from a coolant outlet port 152a via a coolant return conduit 28. The coolant supply device 22 can comprise, for example, a coolant tank (not illustrated) in which coolant is stored, a cooling device (not illustrated) for lowering the temperature of the coolant in the coolant tank to a predetermined temperature, and a coolant supply pump (not illustrated) for discharging coolant supplied from the coolant tank into the coolant supply conduit 26.

Figure 1:
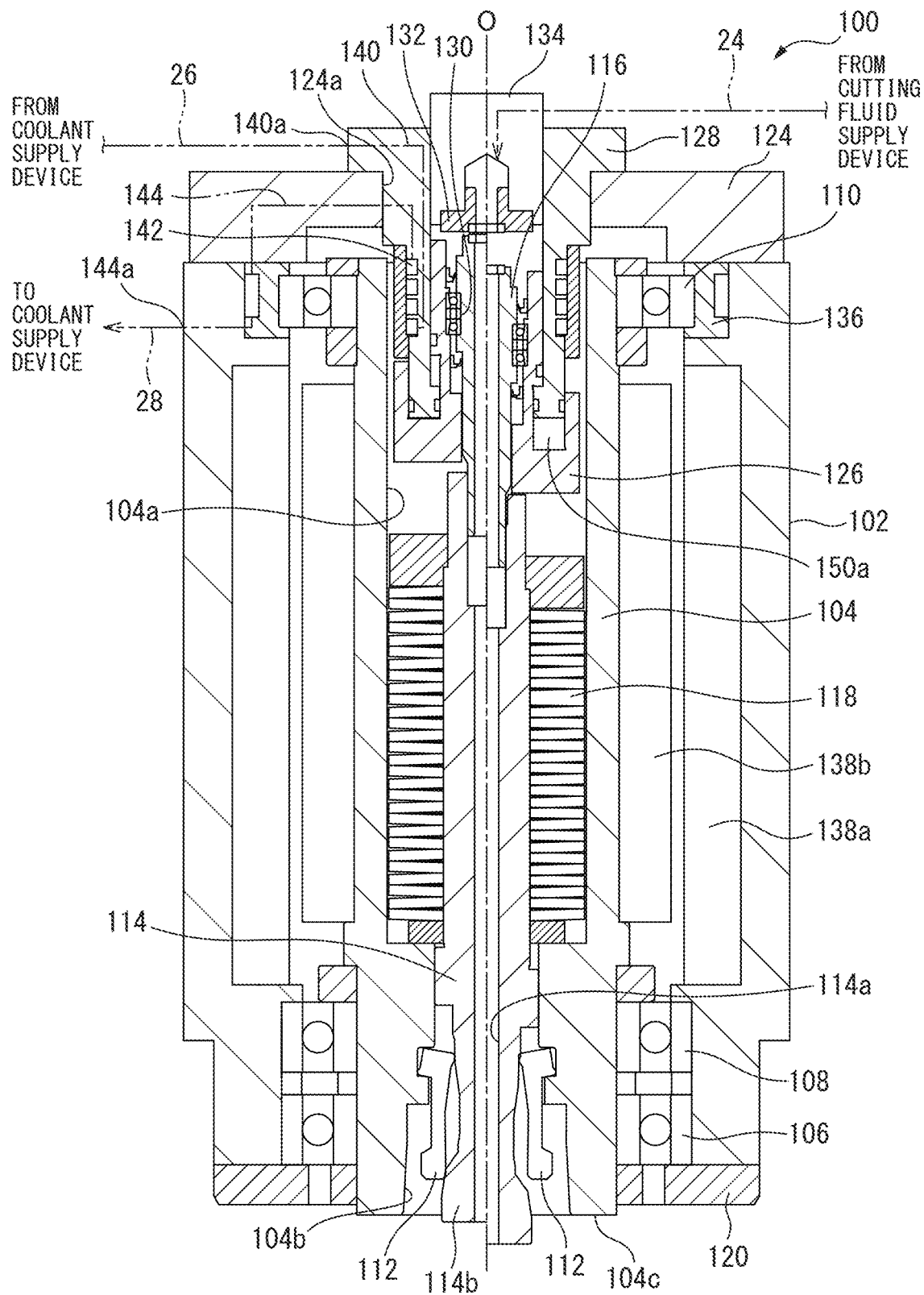
FIG. 1 is a cross-sectional view of a spindle device according to a preferred embodiment of the present invention.
Figure 2:
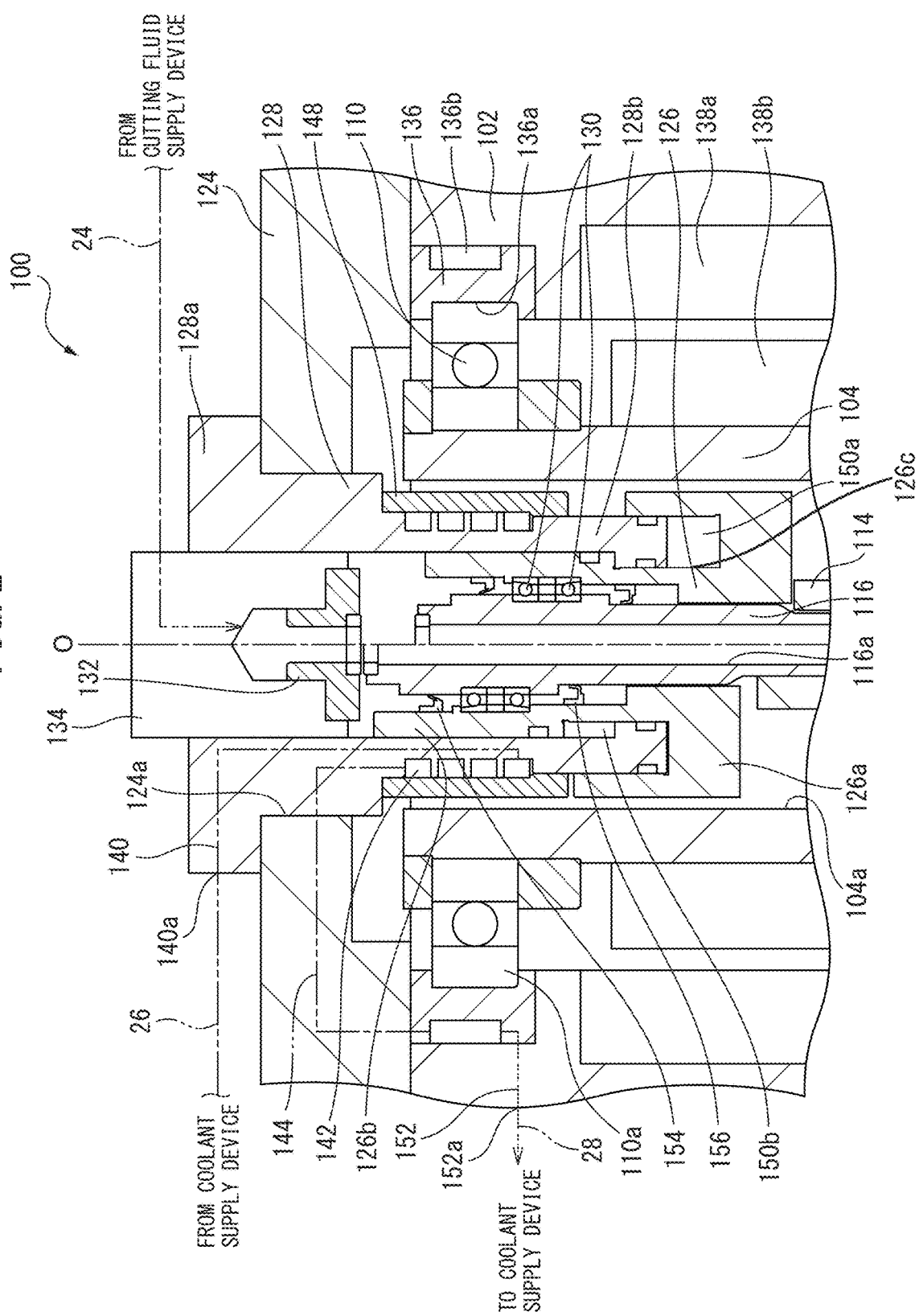
FIG. 2 is an enlarged partial cross-sectional view showing an enlarged main portion of the spindle device of FIG. 1.

Next, with reference to FIGS. 1 and 2, the spindle device 100 comprises a hollow housing 102 both ends of which are open, and a spindle 104 which is rotatably supported in the housing 102. The openings of the front end and rear end of the housing 102 are closed by an annular front end plate 120 and an annular rear end plate 124, respectively. The spindle 104 is a hollow cylindrical member having a gap 104a which extends from the rear end toward the front end along the longitudinal axis O. Furthermore, a tapered hole 104b in which the tool holder TH is mounted is formed in the front end of the spindle 104.

The spindle 104 is rotatably supported by a plurality of bearings 106, 108, and 110. Bearing 110, as the first bearing arranged on the rear end side of the spindle 104, is affixed in the housing 102 via a bearing casing 136. The bearing casing 136 is an annular member which includes an inner circumferential groove 136a which accepts an outer ring of the bearing 110 in an inner circumferential surface thereof, and an outer circumferential groove formed in the outer circumferential surface thereof. When the bearing casing 136 is affixed in a predetermined position within the housing 102, an annular coolant passage 136b is defined between the inner circumferential surface of the housing 102 and the outer circumferential groove. In order to prevent the leakage of coolant from the annular coolant passage 136b, a suitable seal member such as an O-ring can be arranged between the bearing casing 136 and the housing 102.

A built-in motor for rotationally driving the spindle 104 is arranged within the housing 102 of the spindle device 100. The built-in motor comprises a fixed side stator 138a and a movable side rotor 138b. The stator 138a is affixed to the inner circumferential surface of the housing 102. The rotor 138b is affixed to the outer circumferential surface of the spindle 104 opposite the stator 138a via a small gap in the radial direction.

In order to clamp the tool holder TH within the tapered hole 104b, the spindle 104 comprises a clamping device including a draw bar 114 which extends within the gap 104a of the spindle 104 along axis O, a plurality of collets 112 which are arranged within the tapered hole 104b at equal angular intervals in the circumferential direction about the draw bar 114, and a plurality of disc springs 118 arranged about the draw bar 114 within the gap 104a of the spindle 104. The draw bar 114 is movable along axis O between a clamped position shown on the left side of axis O in FIGS. 1 and 2, and an unclamped position shown on the right side of axis O in FIGS. 1 and 2.

The draw bar 114 is a hollow rod-like member having a central hole or cutting fluid passage 114a which extends in the longitudinal direction along axis O, and a large-diameter engagement part 114b is formed on a tip thereof. The draw bar 114 is biased toward the clamped position along axis O by the elastic force of the disk springs 118. The size and number of disk springs 118 can be appropriately determined such that the tool holder TH can be suitably clamped within the tapered hole 104b and such that the draw bar 114 can be biased in the rearward direction by a predetermined drawing force along axis O.

A support shaft 116 having a central hole or cutting fluid passage 116a which extends in the longitudinal direction along axis O is connected to a rear end of the draw bar 114. The support shaft 116 is arranged coaxial with the draw bar 114 along axis O, and is connected with a rear end portion of the draw bar 114. The support shaft 116 and draw bar 114 are connected with each other by known means such as a spline connection or a polygon connection so as to be movable in the axial direction but so as to not be capable of relatively rotating. The support shaft 116 rotates together with the draw bar 114, and is rotatably supported on a piston 126 via a bearing 130 as a second bearing, which will be described later. In order to retain the lubricant for the bearing 130, seal members 154 and 156 are arranged between the support shaft 116 and a stem part 126b so as to closely contact the outer peripheral surface of the support shaft 116 and the inner peripheral surface of the stem part 126b of the piston 126.

When the draw bar 114 is in the clamped position, the joint piston 132 of the rotary joint 134 is biased in the tip direction of the spindle 104, and the joint piston 132 abuts against the rear end of the support shaft 116, whereby the cutting fluid passage 114a of the draw bar 114 and the cutting fluid passage 116a of the support shaft 116 communicate to form a single cutting fluid passage extending through the spindle 104.

Collets 112, which are engageable with the engagement part 114b of the draw bar 114, are arranged in the tapered hole 104b of the spindle 104. When the draw bar 114 moves in the rearward direction along axis O of the spindle 104, the collets 112 engage with the engagement part 114b of the draw bar 114 and are biased radially outwardly. As a result, the tips of the collets 112 engage with the tapered part of the tool holder TH, draw the tool holder TH in the rearward direction of the spindle 104 along axis O, and clamp the tool holder TH within the tapered hole 104b. When the drawbar 114 is moved forward along axis O by an unclamping device, which is described later, the engagement between the collets 112 and the engagement part 114b is released.

When the draw bar 114 is moved rearwardly by the elastic force of the disk springs 118, the collets 112 are spread radially, increasing the inner diameter thereof, and the tapered surface and flange rear surface (not illustrated) of the tool holder TH, which is inserted into the tapered hole 104b, abut the inner surface (the tapered surface) of the tapered hole 104b and the front end surface 104c of the spindle 104, whereby the tool holder TH is clamped in the tapered hole 104b by so-called "double-sided restraint." In the present embodiment, though the tool holder TH is a 1/10 short tapered HSK shank, the tool holder TH may be a 7/24 tapered BT shank. When the tool holder TH is a BT shank, the collets 112 are configured so as to retain the pull stud affixed to the rear end of a shank part of the tool holder TH.

An unclamping device is arranged in the gap 104a of the spindle 104 in a rear portion of the spindle 104. The unclamping device comprises a cylinder 128 as a boss member which is inserted in the gap 104a of the spindle 104 through the central opening 124a of the rear-end plate 124, and a piston 126, which is reciprocally movable in the axial direction of the draw bar 114, within the annular gap between the spindle 104 and the draw bar 114. The boss member may be formed from a hollow cylindrical member different from the cylinder 128.

The cylinder 128 comprises a large-diameter flange part 128a affixed to the rear-end plate 124, and a hollow cylindrical barrel part 128b connects with the flange part 128a. When the cylinder 128 is attached to the rear-end plate 124, the barrel part 128b penetrates into the gap 104a of the spindle 104 along axis O of the spindle 104.

A helical groove is formed in the outer circumferential surface of the barrel part 128b of the cylinder 128 about axis O. In the present embodiment, a hollow cylindrical cover member 148 is arranged so as to be in close contact with the outer circumferential surface of the barrel part 128b of the cylinder 128, and a helical coolant passage 142 about axis O is defined by the helical groove and the cover member 148. The end of the helical coolant passage 142 on the spindle 104 end side preferably serves as an inlet, and the end thereof on the spindle 104 rear end side preferably serves as an outlet. A suitable seal member such as an O-ring may be arranged between the barrel part 128b of the cylinder 128 and the cover member 148.

The piston 126 comprises a large-diameter contact part 126a, and a small-diameter stem part 126b which extends in the rearward direction along axis O from the contact part 126a and which is arranged within the stem part 126b so as to be slidable along the inner circumferential surface of the barrel part 128b. A pair of bearings 130 for rotatably supporting the aforementioned support shaft 116 are arranged between the inner circumferential surface of the stem part 126b and the outer circumferential surface of the support shaft 116. The piston 126 is arranged within the barrel part 128b of the cylinder 128 so as to be slidable in the axial direction relative to the cylinder 128 without rotating along with the support shaft 116.

As a result of the engagement between the piston 126 and the cylinder 128, a first pressure chamber 150a and a second pressure chamber 150b are formed. More specifically, an annular groove 126c which receives the tip portion of the barrel part 128b of the cylinder 128 is formed on the contact part 126a of the piston 126, and the first pressure chamber 150a and the second pressure chamber 150b are formed as shown in FIG. 2 due to the engagement between the annular groove 126c of the piston 126 and the tip portion of the barrel part 128b of the cylinder 128.

Fluid is supplied to the first and second pressure chambers 150a, 150b at a predetermined pressure from a fluid supply device (not illustrated). By supplying a pressurized fluid, which has been pressurized to a predetermined pressure, into the first pressure chamber 150a via an unillustrated hydraulic port, the piston 126 advances in the tip direction of the spindle 104 along axis O, and the contact part 126a of the piston 126 contacts the rear end of the draw bar 114. By continuing to further supply pressurized fluid to the first pressure chamber 150a, the piston 126 further moves the draw bar 114 in the tip direction toward the unclamped position (the state shown on the right side of axis O in FIGS. 1 and 2) against the elastic force of the disk springs 118. The tool holder TH is unclamped in this manner. During this time, pressurized fluid is discharged from the second pressure chamber 150b.

The unclamped tool T is removed from the tapered hole 104b of the spindle 104 along with the tool holder TH by an unillustrated tool exchanger, and after a new tool T is inserted into the tapered hole 104b, due to the discharge of pressurized fluid from the first pressure chamber 150a, the piston 126 and the draw bar 114 retract in the rear end direction of the spindle 104 along axis O by the elastic force of the disk springs 118. During this time, pressurized fluid having a predetermined pressure is supplied to the second pressure chamber 150b. As the draw bar 114 retracts due to the elastic force of the disk springs 118, the collets 112 are biased in the radial direction within the tapered hole 114b due to the engagement between the collets 112 and the engagement part 114b of the draw bar 114, engage with the tool holder TH within the tapered hole 104b, and draw the tool holder TH into the tapered hole 104b. When the draw bar 114 reaches the clamped position, the tool holder TH is fully drawn into the tapered hole 104b of the spindle 104, and the draw bar 114 stops. After the draw bar 114 reaches the clamped position, when pressurized fluid is further supplied to the second pressure chamber 150b, the piston 126 separates from the rear end of the draw bar 114 (the state shown on the left side of axis O in FIGS. 1 and 2).

In the present embodiment, the coolant passage includes the inlet-side coolant passage 140 which extends between the coolant inlet port 140a formed in the cylinder 128 and the inlet of the helical coolant passage 142, the helical coolant passage 142, the intermediate coolant passage 144 which extends between the outlet of the helical coolant passage 142 and the annular coolant passage 136b, the annular coolant passage 136b, and the outlet-side coolant passage 152 which extends between the annular coolant passage 136b and the coolant outlet port 152a. In the present embodiment, the inlet-side coolant passage 140 is formed in the cylinder 128, the intermediate coolant passage 144 is formed in the cylinder 128, the rear-end plate 124, and the bearing casing 136, and the outlet-side coolant passage 152 is formed in the bearing casing 136 and the housing 102.

Suitable seal members such as O-rings can be arranged in the intermediate coolant passage 144 between the cylinder 128 and the rear-end plate 124, and between the rear-end plate 124 and the bearing casing 136. Likewise, a suitable seal member such as an O-ring can be arranged in the outlet-side coolant passage 152 between the bearing casing 136 and the housing 102. Furthermore, the coolant inlet port 140a and the coolant outlet port 152a can be formed by suitable joint members such as nipples.

According to the present embodiment, due to the flow of coolant through the coolant passage, and particularly through the helical coolant passage 142 of the cylinder 128, the cylinder 128 as a boss member can be cooled, and in particular, the outer circumferential surface of the cover member 148 covering the helical groove of the barrel 128b of the cylinder 128 becomes cooler than the surroundings. As a result, the air surrounding the cylinder 128, in particular, the air in contact with the outer circumferential surface of the cover member 148, is cooled, and the rear end of the spindle 104 is cooled by the cooled air.

By arranging the helical coolant passage 142 so that the helical coolant passage is adjacent to the bearing 110 in the transverse direction relative to axis O, specifically, by arranging the helical coolant passage 142 and the bearing 10 at least partially within a plane perpendicular to axis O, the bearing 110 can be effectively cooled. By adjusting the gap between the cylinder 128 and the spindle 104, and in particular, between the outer circumferential surface of the cover member 148 and the inner circumferential surface of the spindle 104, the cooling effect brought about by the helical coolant passage 142 can be adjusted. Effective cooling can be achieved by the annular coolant passage 136b which is adjacent to the bearing 110 in the transverse direction relative to axis O, as well.

Further, the stem part 126b of the piston 126, which is in close contact with the cooled cylinder 128, is cooled, and the bearing 130 and the seal members 154, 156, which are in close contact with the stem part 126b, are cooled. In particular, when the draw bar 114 is in the clamped position, as shown on the left side of axis O in FIGS. 1 and 2, by arranging the helical coolant passage 142 so that the helical coolant passage 142 is adjacent to the bearing 130 and the seal members 154, 156 in the transverse direction relative to axis O, specifically, by arranging the helical coolant passage 142 and the bearing 130 at least partially within a plane perpendicular to axis O, heat generated by the bearing 130 and the seal members 154, 156 during rotation of the spindle 104 can be effectively removed.

Thus, in the present embodiment, since the cooling passages 140, 142, 136b, 144, and 152 extend through the stationary members of the spindle device 100, the rear end of spindle device 100 can be effectively cooled while the leakage of the coolant can be easily and reliably prevented.

REFERENCE SIGNS LIST

10 Machine Tool
22 Coolant Supply Device
26 Coolant Supply Conduit
28 Coolant Return Conduit
100 Spindle Device
102 Housing
104 Spindle
104a Gap
110 Bearing
114 Draw Bar
116 Support Shaft
124 Rear End Plate
126 Piston
128 Cylinder
130 Bearing
136 Bearing Casing
136b Annular Coolant Passage
140 Inlet-Side Coolant Passage
140a Coolant Inlet Port
142 Helical Coolant Passage

The invention claimed is:

1. A spindle device for a machine tool including a hollow spindle which is rotatably supported in a housing, the spindle device comprising:
   an annular boss member which is affixed to the housing so as not to rotate with the spindle, which is formed so as to penetrate into the spindle, and which includes an opening formed in the axial direction of the spindle,
   a cooling passage formed in an outer circumferential surface of the boss member so as to face an inner circumferential surface of the spindle,
   a first bearing, arranged between a rear end of the spindle and the housing, for rotatably supporting the spindle,
   an annular bearing casing which includes an inner circumferential groove configured to receive the first bearing, and an outer circumferential groove,
   a first coolant passage extending through the boss member from an inlet port formed in the boss member to the cooling passage, and
   a second coolant passage extending through the boss member and the housing from the cooling passage to an outlet port formed in the housing, wherein
   the cooling passage is formed by a groove extending along the outer circumferential surface of the boss member, and a cover member in the form of a cylinder arranged so as to be in close contact with the outer circumferential surface of the boss member, and separated from the inner circumferential surface of the spindle by an air gap,
   the spindle is cooled by the air in the air gap which is cooled by contacting with the outer circumferential surface of the cover member which is cooled by flow of coolant through the cooling passage, and
   the outer circumferential groove of the bearing casing forms a part of the second coolant passage.

2. The spindle device for a machine tool of claim 1, further comprising a draw bar for drawing in and clamping a tool holder to the tip of the spindle,
   a support shaft coupled to a rear end of the draw bar so as to rotate with the draw bar, and
   an unclamping device which is supported in the housing and which is provided in an annular gap between an inner circumference of the spindle and an outer circumference of the support shaft.

3. The spindle device for a machine tool of claim 2, wherein the cooling passage extends helically about an axis of the spindle.

4. The spindle device for a machine tool of claim 3, wherein
   the cooling passage is at least partially arranged in the same plane as the first bearing, which is perpendicular to the axis of the spindle.

5. The spindle device for a machine tool of claim 4, wherein the unclamping device is provided with a cylinder provided by the boss member, and a piston reciprocal along the axis of the spindle between a clamped position and an unclamped position relative to the cylinder,
   the piston includes a contact part and a hollow stem part which extends in the rearward direction along the axis of the spindle from the contact part and is arranged within the cylinder so as to be slidable along the inner circumferential surface of the cylinder,
   the support shaft is rotatably supported by a second bearing which is arranged between the inner circumferential surface of the stem part and the outer circumferential surface of the support shaft.

6. The spindle device for a machine tool of claim 5, wherein the piston is formed so as to contact the rear end of the draw bar with the contact part and push the draw bar toward the front of the spindle by moving forward along the axis of the spindle from the clamped position to the unclamped position, and
   when the piston is in the clamped position, the cooling passage is at least partially arranged in the same plane as the second bearing, which is perpendicular to the axis of the spindle.

* * * * *